United States Patent Office 3,163,677
Patented Dec. 29, 1964

3,163,677
PROCESS FOR PREPARING N,N,O-TRISUBSTITUTED HYDROXYL AMINES AND N,N-DISUBSTITUTED NITROXIDES AND PRODUCTS
Arthur Kentaro Hoffman and Audrey Tesch Henderson, Stamford, Conn., assignors to American Cyanamid Company, New York, N.Y., a corporation of Maine
No Drawing. Filed Aug. 7, 1961, Ser. No. 129,560
9 Claims. (Cl. 260—583)

This invention relates to new chemical compounds and processes for preparing the same. More particularly, this invention relates to N,N,O-trisubstituted hydroxylamines, to N,N-disubstituted hydroxylamines and to N,N-disubstituted hydroxylammonium salts. This invention further relates to N,N-disubstituted nitroxides. This invention further relates to processes for preparing these compounds.

The reduction of certain nitro and nitroso compounds with alkali metals to obtain hydroxylamines has been described by Lukaschewitsch, Annalen, 521, 198 (1936). However, the product obtained by Lukaschewitsch's sodium metal reduction of both nitro and nitroso benzene was phenylhydroxylamine, a monosubstituted product. Disubstituted hydroxylamines have been prepared by different methods. For example, N,N-diphenylhydroxylamine was prepared from the reaction of phenyl magnesium bromide and nitrosobenzene by Wieland and Offenbächer, Ber., 47, 2111 (1914), but the oxidation of N,N-diphenylhydroxylamine with silver oxide afforded diphenyl nitric oxide which, even when highly purified, was stable for less than a day. Banfield and Kenyon, J. Chem. Soc., 1612 (1926), obtained a condensation product of β-phenylhydroxylamine and acetone, whose oxidized derivative appeared to have properties similar to diphenyl nitric oxide.

To our knowledge, Wieland and Offenbächer's diphenyl nitric oxide and Banfield and Kenyon's oxidized condensation product are among the few known compounds possessing a quadrivalent nitrogen atom. In every instance, however, at least one aromatic nucleus was present on the nitrogen atom.

We have now discovered that N,N,O-trisubstituted hydroxylamines and N,N-disubstituted nitroxides of the Formulae I and II, respectively,

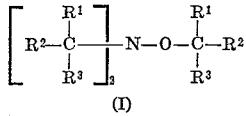

(I)

and

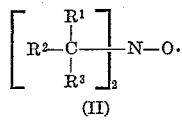

(II)

wherein $R^1$, $R^2$, $R^3$ are each an alkyl radical having from 1 to 15 carbon atoms, i.e., methyl, ethyl, propyl, etc. to and including pentadecyl, may be obtained in good yield and by a simple procedure by reduction of the corresponding tertiary nitro or nitroso alkanes with an alkali metal in an inert reaction medium. The novel N,N,O-trisubstituted hydroxylamines of the present invention because of the presence of two tertiary carbon atoms on the nitrogen atom are valuable intermediates for the preparation of the other classes of novel compounds of this invention, N,N-disubstituted hydroxylammonium salts, which may be converted to N,N-disubstituted hydroxylamines, from which may then be obtained N,N-disubstituted nitroxides. Alternatively, the N,N,O-trisubstituted hydroxylamines may be used to prepare the N,N-disubstituted nitroxides directly by exposure to an oxidizing atmosphere such as air. The N,N-disubstituted nitroxides of this invention are stable free radicals and as such are useful as polymerization inhibitors, antiknock agents in fuels, antioxidants for rubbers and other compounds such as olefins normally subject to atmospheric oxidation. Additionally, the N,N-disubstituted nitroxides of the present invention may be used as traps for reactive free radicals and as paramagnetic standards for electron spin resonance spectrometry.

Suitable tertiary nitro and nitroso compounds which may be employed in the process of this invention are included in the following non-limiting listing: 2-nitro-2-methyl propane, 2-nitro-2-methyl butane, 2-nitro-2,3-dimethyl butane, 2-nitro-2-methyl pentane, 2-nitro-2,4-dimethyl pentane, 2-nitro-2,4,4-trimethyl pentane, 2-nitro-2,5-dimethyl hexane, 2-nitro-2,6-dimethyl heptane, 3-nitro-3-ethyl pentane, 1-nitro-1-methyl cyclopentane, 1-nitro-1-methyl cyclohexane, 1-nitro-1,4-dimethyl cyclohexane and the like; 2-nitro-2-phenyl propane, 2-nitroso-2-methyl propane and the like. Higher tertiary nitroalkanes may be readily obtained by the procedure of Kornblum, Clutter and Jones, J. Am. Chem. Soc., 78, 4003 (1956). Similarly, other tertiary nitrosoalkanes may be prepared by the method outlined by Emmons, J. Am. Chem. Soc., 79, 6522 (1957).

While we do not wish to be limited to any particular theory or reaction mechanism, it is believed that the formation of a typical N,N,O-trisubstituted hydroxylamine and its derivative, N,N-disubstituted nitroxide from a tert-nitroalkane, involves the conversion of tert-nitroalkane by an alkali metal in an inert reaction medium to the anion radical of tert-nitroalkane which is unstable and decomposes according to reactions outlined below in which a tertiary alkyl grouping is represented by R and an alkali metal by M.

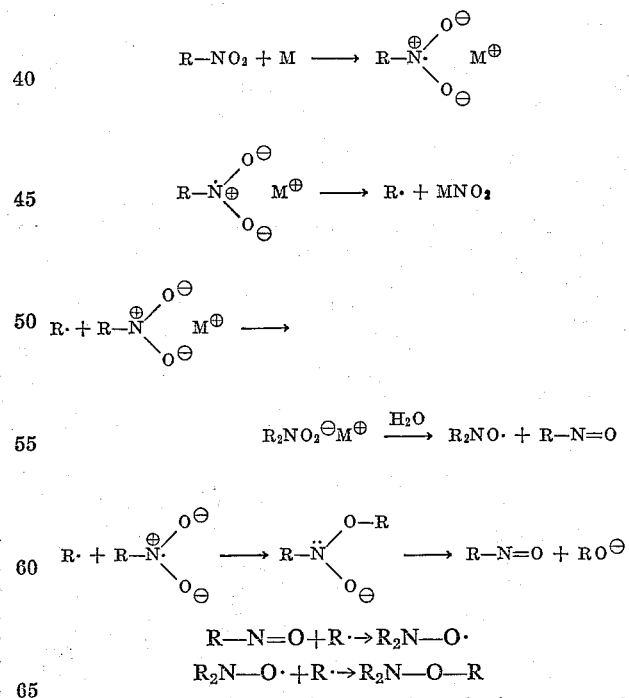

The inert reaction medium or solvent is then removed by conventional methods from the reaction mixture obtained by the interaction of alkali metal with tert-nitroalkane. The resulting residue may be then hydrolyzed with water to give a mixture consisting largely of N,N,O-tri-tert-alkyl hydroxylamine and N,N - di - tert-alklylnitroxide which mixture is then separated, e.g., by decantation or other conventional means, and dried. Alternatively, the residue may be washed with an inert solvent, e.g., petroleum ether, pentane, and the like, and the solvent is then removed as by evaporation or similar procedure. Better yields, however, are usually obtained by the use of water rather than an inert solvent.

An equation summarizing reactants and products is shown:

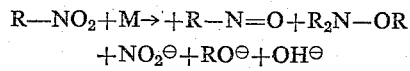

The N,N-disubstituted nitroxide in addition to the N,N,O-trisubstituted hydroxylamine may be readily converted to the corresponding N,N-disubstituted hydroxyl ammonium salt by reaction of the same with a mineral acid such as hydrogen chloride, hydrogen bromide, hydrogen iodide, sulfuric, nitric, perchloric, fluoroboric and the like and trifluoroacetic acid. The following scheme indicates a typical preparation wherein a mineral acid, represented by HAn, is reacted with an N,N-disubstituted nitroxide of which the tertiary alkyl grouping is represented by R:

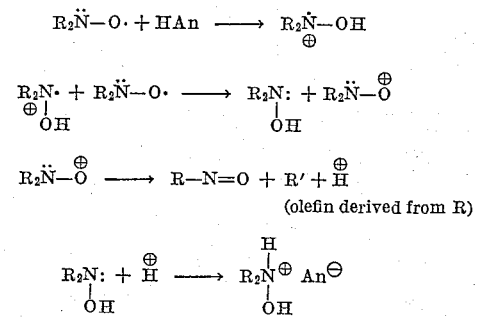

(olefin derived from R)

By treatment of the thus obtained N,N-disubstituted hydroxylammonium salt with a base such as alkali metal, alkaline earth metal and ammonium hydroxides, or carbonates, e.g., sodium hydroxide, potassium hydroxide, ammonium hydroxide, barium hydroxide, sodium carbonate, potassium carbonate and the like, N,N,-disubstituted hydroxylamine may be obtained which may be further converted by means of air oxidation to N,N,-disubstituted nitroxide.

The reduction of the corresponding nitro or nitroso alkane to N,N,O-trisubstituted hydroxylamine and N,N-disubstituted nitroxide is accomplished in an inert reaction medium, in the absence of oxygen or moisture, with any of the alkali metals such as sodium, potassium, and lithium. Of these, sodium is preferred because of the better yields which may be obtained. Approximately one mole of alkali metal is required for each mole of nitro or nitroso compound. However, it is usually preferable to employ a slight excess of the nitro or nitroso compound. The temperatures employed in the reduction of the nitro or nitroso compounds may be varied over a wide range. In general, however, temeratures of from about −80° C. to about 100° C. are employed with good success while temperatures of about 20–50° C. are preferred. While the use of a solvent is not absolutely essential, it is preferable to carry out the reaction in the presence of a solvent which is inert to the reactants. Particularly valuable solvents which may be employed are those designated as polyethers, which constitute the preferred class of solvents, for example, 1,2-dimethoxyethane (glyme), dimethyl ether of diethylene glycol (diglyme), tetrahydrofuran, dimethyl ether and the like. Hydrocarbon solvents both aromatic, e.g., benzene, toluene, xylene and the like, and paraffinic, e.g., hexane, heptane, octane and the like, may also be used. However, mixtures of polyethers and hydrocarbons may also be employed.

The oxidation of N,N-disubstituted hydroxylamine to the corresponding N,N-disubstituted nitroxide is easily accomplished by exposure of the same to air. However, suitable other oxidizing agents such as oxygen, silver oxide, mercuric oxide, chloranil and the like may also be used with advantage.

In order to illustrate the principal features of the present invention, the following illustrative examples are given.

EXAMPLE 1

*Preparation of N,N,O-Tri-Tert-Butylhydroxylamine and N,N-Di-Tert-Butylnitroxide From Tert-Nitrobutane*

A 500 milliliter Erlenmeyer flask containing glass chips and a magnetic stirring bar is heated at 160°–175° C. for an hour, cooled, and charged with tert-nitrobutane, 25 grams (0.24 mole). The flask is connected to a nitrogen flushed distillation apparatus and 250 milliliters of 1,2-dimethoxyethane (glyme) distilled into the flask under nitrogen. Metallic sodium, 5.5. grams (0.24 mole), cut into fine chips, is added under a nitrogen blanket and the reaction mass is stirred for 48 hours. The resulting reaction mixture is a white solid suspended in a pale yellow liquid. The mixture is vacuum evaporated to obtain a colorless solid shown to contain sodium nitrite, sodium tert-butoxide and adsorbed N,N-di-tert-butylnitroxide together with N,N,O-tri-tert-butylhydroxylamine. The solid is dried in vacuo at 50° C. and is air and moisture sensitive.

EXAMPLE 2

*Isolation of N,N,O-Tri-Tert-Butylhydroxylamine and N,N,-Di-Tert-Butylnitroxide*

Twenty-six grams of the resulting colorless solid obtained in Example 1 is dissolved in water under a nitrogen atmosphere to give a red organic immiscible layer which is separated and dried over calcium sulfate. Oxygen is passed over this liquid to insure complete oxidation. The crude product contains small amounts of tert-nitrosobutane. Preparative vapor phase chromatography through a 5 foot column packed with silicone grease on diatomaceous earth gives 6.1 g. of pure N,N,O-tri-tert-butylhydroxylamine

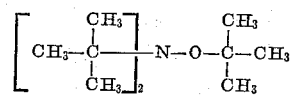

and 2 grams of pure N,N-di-tert-butylnitroxide,

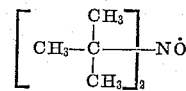

N,N,-di-tert-butylnitroxide is paramagnetic having an electron resonance spin assay indicating one unpaired electron per mole.

*Analysis.*—Calcd. for C$_8$H$_{18}$NO: C, 66.63; H, 12.50; N, 9.72. Found: C, 66.77; H, 12.90; N, 9.74.

Molecular weight: Calcd.: 144. Found: (isopiestic) 161, (cryoscopic) 128±6.

This material has a mass spectrum showing two peaks; one at mass 145 and one at mass 144, the two being present in a ratio of 30:70. Thus, the mass spectrum, the molecular weight determinations, the intense paramagnetism coupled with a triplet hyperfine structure in the electron spin resonance spectrum of the free radical and the infrared spectrum of this material establishes its structure as

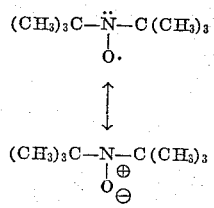

EXAMPLE 3

*Preparation of N,N-Di-Tert-Butylhydroxylammonium Chloride From N,N-Di-Tert-Butylnitroxide*

Anhydrous hydrogen chloride is bubbled through a petroleum ether solution of N,N-di-tert-butylnitroxide. A white precipitate is formed consisting of N,N-di-tert-butylhydroxylammonium chloride together with a blue supernatant solution. The blue supernatant solution contains tert-nitrosobutane. The solid is removed by filtration and after recrystallization from either hot benzene or acetonitrile has M.P. 181–183° frothing with decomposition in a sealed capillary. It has a nuclear magnetic resonance spectrum which establishes the identity of both tert-butyl groups as being on nitrogen and the ratio of C—H protons to total NH plus OH protons is 9:1. The structure of this solid is thus established as

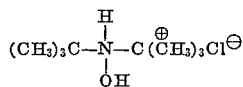

and it additionally has an infrared spectrum fully consistent with the depicted structure.

*Analysis.*—Calcd. for $C_8H_{20}NOCl$: C, 52.87; H, 10.84; N, 7.53; Cl, 19.07. Found: C, 52.58; H, 10.82; N, 7.75; Cl, 19.01.

EXAMPLE 4

*Preparation of N,N-Di-Tert-Butylhydroxylammonium Chloride From N,N,O-Tri-Tert-Butylhydroxylamine*

Anhydrous HCl is passed through a petroleum ether solution of N,N,O-tri-tert-butylhydroxylamine until no further precipitate forms. The white solid is worked up as in Example 3 to give N,N-di-tert-butylhydroxylammonium chloride.

EXAMPLE 5

*Preparation of N,N-Di-Tert-Butylhydroxylamine*

N,N-di-tert-butylhydroxylammonium chloride is reacted with aqueous-dilute sodium hydroxide solution to form a colorless water insoluble solid which is extracted with several volumes of petroleum ether. Evaporation of the solvent yields a solid having an infrared spectrum consistent with its formulation as the free base: N,N-di-tert-butylhydroxylamine. The solid is unstable in air, oxidizing back relatively rapidly to the red liquid free radical, N,N-di-tert-butylnitroxide.

EXAMPLE 6

*Preparation of N,N,O-Tri-Tert-Butylhydroxylamine and N,N-Di-Tert-Butylnitroxide From Tert-Nitrosobutane*

Following the procedure of Example 1, above, nitroso-tert-butane (dimer), 8.7 grams (0.05 mole) is reacted with sodium, 20 grams (0.09 mole) in 1,2-dimethoxyethane. The resulting dry colorless solid after solvent removal and dissolution in water gives N,N-di-tert-butyl nitroxide and N,N,O-tri-tert-butylhydroxylamine.

EXAMPLE 7

*Isolation of N,N,O-Tri-Tert-Butylhydroxylamine and N,N-Di-Tert-Butylnitroxide From Tert-Nitrosobutane*

The colorless solid obtained in Example 6 is triturated with pentane and filtered. The pentane is evaporated to give N,N,O-tri-tert-butylhydroxylamine and N,N-di-tert-butylnitroxide.

EXAMPLE 8

*Preparation of N,N,O - Tris - 2,4,4 - Trimethylpentylhydroxylamine and N,N-di-2,4,4-Trimethylpentylnitroxide From 2,4,4-Tri-Methyl-2-Nitro Pentane*

Following the procedure of Example 1, above, 2,4,4-tri-methyl-2-nitro pentane, 10 grams (0.063 mole), is reacted with sodium, 1.45 grams (0.063 mole in 1,2-dimethoxyethane. The reaction mixture is vacuum evaporated to obtain a colorless solid shown to contain N,N,O-tris-2,4,4-trimethylpentylhydroxylamine and N,N-di-2,4,4-trimethylpentylnitroxide.

EXAMPLE 9

*Isolation of N,N,O - Tris-2,4,4-Trimethylpentylhydroxylamine and N,N-di-2,4,4-Trimethylpentylnitroxide*

The colorless solid obtained in Example 8 is dissolved in water according to the procedure of Example 2, above, to give a liquid shown to contain N,N,O-tris-2,4,4-trimethylpentylhydroxylamine and N,N - di-2,4,4-trimethylpentylnitroxide.

EXAMPLE 10

*Preparation of N,N,O-Tri-Tert-Butylhydroxylamine and N,N-Di-Tert - Butylnitroxide From Tert - Nitrobutane and Lithium*

The procedure of Example 1, above, is followed in every respect with the exception that the alkali metal used is lithium, 1.7 grams (0.24 mole). The resulting dry solid is shown to contain N,N,O - tri - tert-butylhydroxylamine and N,N-di-tert-butylnitroxide, lithium nitrite and lithium-tert-butoxide.

EXAMPLE 11

*Isolation of N,N,O-Tri-Tert-Butylhydroxylamine and N,N-Di-Tert-Butylnitroxide*

The solid obtained in Example 10 is dissolved in water according to the procedure of Example 2, above, to give N,N,O-tri-tert-butylhydroxylamine and N,N-di-tert-butylnitroxide.

EXAMPLE 12

*Preparation of N,N,O-Tri-Tert-Butylhydroxylamine and N,N-Di-Tert-Butylnitroxide Derived From Tert-Nitrobutane and Potassium in Tetrahydrofuran*

The procedure of Example 1, above, is followed in every respect with the exception that the alkali metal used is potassium, 9.4 grams (0.24 mole) and the solvent used is tetrahydrofuran. The resulting solid contains N,N,O-tri-tert-butylhydroxylamine and N,N-di-tert-butyl-nitroxide, potassium nitrite and potassium tert-butoxide.

EXAMPLE 13

*Isolation of N,N,O-Tri-Tert-Butylhydroxylamine and N,N-Di-Tert-Butylnitroxide*

The solid obtained in Example 12 is dissolved in water according to the procedure of Example 2, above, to give N,N,O-tri-tert-butylhydroxylamine and N,N-di-tert-butylnitroxide.

EXAMPLE 14

Two heavy-walled test tubes are charged with 10.0 part portions of distilled styrene and 0.001 part of N,N-di-tert-butylnitroxide prepared according to Example 2 is added to the second tube. The tubes, whose contents are allowed to remain in contact with air, are then placed in an oil bath maintained at 150° C. After six hours the tubes are removed from the oil bath. At the end of this time, the styrene containing no N,N-di-tert-butylnitroxide had set to a solid mass. However, the styrene containing N,N-di-tert-butylnitroxide was still fluid and contained only a very small amount of polymer based upon a viscosity determination of the sample.

While the foregoing invention has been described in conjunction with certain preferred embodiments, it is to be understood that numerous other modifications may be made in the process herein without departing from the scope of the invention. Consequently, the invention is to be construed broadly and is to be restricted only by the appended claims.

We claim:

1. An N,N,O-trisubstituted hydroxylamine of the formula

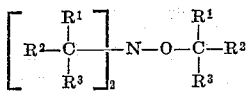

wherein $R^1$, $R^2$ and $R^3$ are each selected from the group consisting of alkyl radicals having from one to fifteen carbon atoms.

2. An N,N-disubstituted nitroxide of the formula

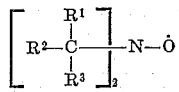

wherein $R^1$, $R^2$ and $R^3$ are each selected from the group consisting of alkyl radicals having from one to fifteen carbon atoms.

3. A process for preparing an N,N,O-trisubstituted hydroxylamine of the formula

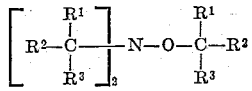

which comprises treating a compound selected from the group consisting of nitro alkanes and nitroso alkanes of the formulae

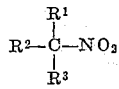

and

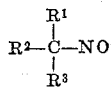

with an alkali metal, said compound and said metal being present in approximately equimolar amounts, at a temperature of from about −80° C. to about 100° C. in an inert reaction medium, and recovering the resultant N,N,O-trisubstituted hydroxylamine, $R^1$, $R^2$ and $R^3$ in each of said formulae representing a radical selected from the group consisting of alkyl radicals having from one to fifteen carbon atoms.

4. A process for preparing an N,N-disubstituted nitroxide of the formula

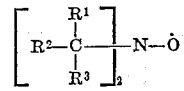

which comprises treating a compound selected from the group consisting of nitro alkanes and nitroso alkanes of the formulae

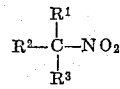

and

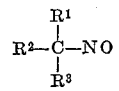

with an alkali metal, said compound and said metal being present in approximately equimolar amounts, at a temperature of from about −80° C. to about 100° C. in an inert reaction medium and recovering the resultant N,N-disubstituted nitroxide, $R^1$, $R^2$ and $R^3$ in each of said formulae representing a radical selected from the group consisting of alkyl radicals having from one to fifteen carbon atoms.

5. A process for preparing an N,N-disubstituted nitroxide of the formula

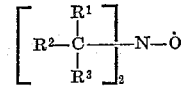

which comprises subjecting an N,N-disubstituted hydroxyl amine of the formula

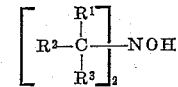

to oxidative conditions and recovering the resultant N,N-disubstituted nitroxide, $R^1$, $R^2$ and $R^3$ in each of said formulae representing a radical selected from the group consisting of alkyl radicals having from one to fifteen carbon atoms.

6. A process for preparing an N,N-disubstituted nitroxide of the formula

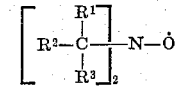

which comprises subjecting an N,N,O-trisubstituted hydroxylamine of the formula

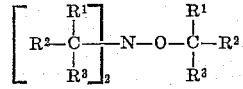

to oxidative conditions and recovering the resultant N,N-disubstituted nitroxide, $R^1$, $R^2$ and $R^3$ in each of said formulae representing a radical selected from the group consisting of alkyl radicals having from one to fifteen carbon atoms.

7. A process for preparing an N,N-disubstituted hydroxylammonium salt of the formula

which comprises treating a compound selected from the group consisting of

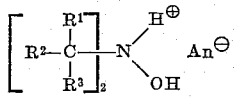

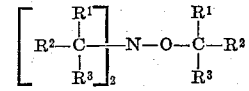

and

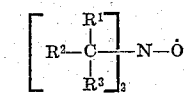

with an acid selected from the group consisting of mineral acids and trifluoroacetic acid, wherein $R^1$, $R^2$ and $R^3$ in each of the formulae represent a radical selected from the group consisting of alkyl radicals having from one to fifteen carbon atoms, and $An^-$ is a univalent anion derived from said acid.

8. An N,N-disubstituted nitroxide of the formula

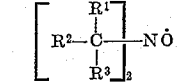

wherein $R^1$, $R^2$ and $R^3$ are each methyl.

9. A process for preparing an N,N-disubstituted nitroxide of the formula

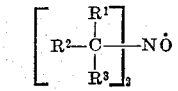

which comprises treating a compound selected from the group consisting of nitro alkanes and nitros alkanes of the formulae

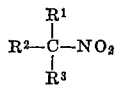

and

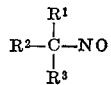

with an alkali metal, said compound and said metal being present in approximately equimolar amounts, at a temperature of from about −80° C. to about 100° C. in an inert reaction medium, obtaining a solid reaction product, hydrolyzing said reaction product and recovering the resultant N,N-disubstituted nitroxide, $R^1$, $R^2$ and $R^3$ in each of said formulae representing a radical selected from the group consisting of alkyl radicals having from one to fifteen carbon atoms.

References Cited in the file of this patent
FOREIGN PATENTS
754,343    Great Britain _____ Aug. 8, 1956

OTHER REFERENCES

Wieland et al.: Ber. Deut. Chem., vol. 47, pp. 2111–15 (1914).
Klages et al.: Ber. Chem., vol. 92, pp. 2606–08 (1959).
"Liebig's Annalen der Chemie," vol. 521, pp. 198–214 (1936).

UNITED STATES PATENT OFFICE
CERTIFICATE OF CORRECTION

Patent No. 3,163,677                        December 29, 1964

Arthur Kentaro Hoffmann et al.

It is hereby certified that error appears in the above numbered patent requiring correction and that the said Letters Patent should read as corrected below.

In the grant, line 1, and in the heading to the printed specification, line 5, name of first inventor, for "Arthur Kentaro Hoffman", each occurrence, read -- Arthur Kentaro Hoffmann --; column 3, line 9, for "$R-NO_2+M \rightarrow \ +R-N=O+R_2N-OR$" read -- $R-NO_2+M \rightarrow R_2NO \cdot +R-N=O+R_2N-OR$ --; column 7, line 11, for "N.N" read -- N,N --.

Signed and sealed this 11th day of May 1965.

(SEAL)
Attest:

ERNEST W. SWIDER                        EDWARD J. BRENNER
Attesting Officer                          Commissioner of Patents